United States Patent [19]

Miyata et al.

[11] Patent Number: 4,729,854

[45] Date of Patent: Mar. 8, 1988

[54] FIRE-RETARDANT RESIN COMPOSITION

[75] Inventors: Shigeo Miyata; Takeshi Imahashi, both of Takamatsu, Japan

[73] Assignee: Kyowa Chemical Industry Co., Ltd., Tokyo, Japan

[21] Appl. No.: 882,033

[22] Filed: Jul. 7, 1986

Related U.S. Application Data

[63] Continuation of Ser. No. 620,100, Jun. 13, 1984, abandoned.

[30] Foreign Application Priority Data

Jun. 17, 1983 [JP] Japan ................................. 58-107841

[51] Int. Cl.$^4$ ..................... C09K 21/00; C08F 6/00; C08K 3/20; C08K 3/22
[52] U.S. Cl. ..................... 252/609; 252/601; 252/602; 260/DIG. 24; 523/205; 524/427; 524/436; 524/441; 528/485; 528/487; 528/488
[58] Field of Search ............... 252/601, 602, 604, 609; 524/210, 408, 423, 424, 427, 436, 583, 441; 106/15.05, 18.11; 260/DIG. 24; 523/205, 207; 528/485, 486, 487, 488; 521/907

[56] References Cited

U.S. PATENT DOCUMENTS

| | | | |
|---|---|---|---|
| 4,085,088 | 4/1978 | Miyata et al. | 106/288 B |
| 4,154,718 | 5/1979 | Miyata et al. | 524/408 |
| 4,284,762 | 8/1981 | Miyata et al. | 528/485 |
| 4,299,759 | 11/1981 | Miyata et al. | 524/210 |

*Primary Examiner*—Stephen J. Lechert, Jr.
*Assistant Examiner*—Howard J. Locker
*Attorney, Agent, or Firm*—Sherman and Shalloway

[57] ABSTRACT

A fire-retardant resin composition comprising
(A) 100 parts by weight of a member selected from the group consisting of the thermoplastic resins and the thermosetting resins,
(B) about 1 to about 50 parts by weight of a halogen-containing organic fire retardant,
(C) about 0.05 to about 10 parts by weight of a hydrotalcite having a BET specific surface area not exceeding about 30 square meters per gram, as a stabilizer, and
(D) 0 to about 20 parts by weight of a fire-retarding assistant other than the fire retardant of (B), above.

20 Claims, No Drawings

FIRE-RETARDANT RESIN COMPOSITION

This application is a continuation of application Ser. No. 620,100, filed Jun. 13, 1984 (abandoned).

This invention relates to a fire-retardant resin composition that has been incorporated with a halogen-containing organic fire retardant and having improved properties in that troubles such as that which occur at the time of molding such a fire-retardant resin composition, or at the time of using the resulting molded article, for example, the corrosion of the metallic parts of a molding machine that come in contact with said resin composition at the time of the molding operation, discoloration of the molded article, or a decline in its heat resistance, weatherability, etc., can be dealt with successfully.

More specifically, this invention relates to a fire-retardant resin composition comprising
- (A) 100 parts by weight of a thermoplastic or thermosetting resin,
- (B) about 1 to about 50 parts by weight of a halogen-containing organic fire retardant,
- (C) about 0.05 to about 10 parts by weight of a hydrotalcite having a BET specific surface area not exceeding about 30 $m^2/g$, as a stabilizer, and
- (D) 0 to about 20 parts by weight of a fire-retarding assistant other than the fire retardant of (B), above.

With the purpose of rendering the thermoplastic or thermosetting resins (in the present invention this term embraces rubbers, i.e. elastomeric resins) fire-retardant, it has been the practice in the past to conjointly use with these resins a halogen-containing organic fire retardant or the halogen-containing organic fire retardant and a fire-retarding assistant other than the fire retardant, for example, such fire-retarding assistants as antimony trioxide and the phosphoric acid esters.

It is however known that when the halogen-containing organic fire retardant is used in an amount of the order such as that the fire-retarding effects can be demonstrated troubles arise during the molding operation and at the time the resulting shaped artcle is used. For example, a halogen gas might evolve when using the article outdoors. Or corrosion of the metallic parts of the molding machine might take place as a result of the resin contacting these parts during the molding operation. Further, the shaped article might become discolored, or there may be a decline in the heat resistance and weatherability to an extent that cannot be ignored.

With the view of reducing these troubles that accompany the use of the halogen-containing organic fire retardants, various halogen-inactivating agents have been tried in the past. For example, there have been used such halogen-inactivating agents as calcium stearate, zinc stearate, double salt of zinc stearate and calcium stearate, basic zinc sulfate, magnesium hydroxide, magnesium oxide and the organic tin compounds.

The mechanism of inactivation by these halogen-inactivating agents or stabilizers that have been tried heretofore intends to inactivate the objectionable action of hydrogen halides by utilizing the reaction of neutralizing the hydrogen halides with these stabilizers to convert them to chlorides, in other words, solid acids which are weaker than the hydrogen halides. However, the neutralization products that are formed as by-products such as $CaCl_2$, $MgCl_2$, $ZnCl_2$, $PbCl_2$ and $SnCl_4$ are substances which, though weak, still show acidity, with the consequence that the aforesaid troubles accompanying the use of the halogen-containing organic fire retardants cannot be resolved substantially. Hence, improvements that are fully satisfactory cannot be obtained.

Our researches were conducted with the view of providing an improved resin composition that can substantially resolve these troubles that are inherent in these halogen-containing organic fire retardants.

These researches led to the discovery that the aforesaid troubles that arise at the time of molding a resin composition incorporated with a halogen-containing organic fire retardant and in using the resulting molded article can be successfully dealt with by using as a stabilizer conjointly with the halogen-containing organic fire retardant a small amount of a hydrotalcite having a BET specific surface area not exceeding about 30 $m^2/g$, preferably not exceeding about 20 $m^2/g$.

According to our investigations, it was found that the hydrotalcites neutralize the hydrogen halides and that the anions contained in the hydrotalcite structure take halogen into its structure as a result of an ion-exchange reaction, with the consequence that the halogens trapped inside the hydrotalcite are rendered substantially insoluble in both water and organic solvents. In addition, the halogens are thermally stabilized up to about 400° C. Hence, the aforesaid troubles are all resolved at once in the case of a halogen-containing fire retardant-incorporated resin composition which uses a hydrotalcite in combination with the halogen-containing fire retardant in the proportion specified.

It was also found that the hydrotalcites having a BET specific surface area not exceeding about 30 $m^2/g$, preferably not exceeding about 20 $m^2/g$, excel in their dispersibility in the resin composition, and thus not only is there no risk of degrading the moldability or properties of the resin composition, but such hydrotalcites are also useful in ensuring that the action of trapping the halogens is manifested uniformly in the composition. Furthermore, since these hydrotalcites do not enter into an objectionable interaction with the other additives, there is no such disadvantage as the hydrotalcites becoming the cause of discoloration of the resin by reacting with, say, can antioxidant.

It is therefore an object of this invention to provide a resin composition having improved fire retardancy, a composition in which the aforementioned troubles in the case of a resin composition incorporated with a halogen-containing organic fire retardant have been successfully dealt with.

The foregoing object as well as other objects and advantages of the present invention will become apparent from the following description.

The fire-retardant resin composition of this invention contains as essential components the following components (A) to (C) and optionally the component (D). It may also contain other additives.
- (A) 100 parts by weight of a thermoplastic or thermosetting resin,
- (B) about 1 to about 50 parts by weight, preferably about 5 to about 30 parts by weight, or a halogen-containing organic fire retardant,
- (C) about 0.05 to about 10 parts by weight, preferably about 0.1 to about 5 parts by weight, of a hydrotalcite having a BET specific surface area not exceeding about 30 $m^2/g$, preferably not exceeding about 20 $m^2/g$, as a stabilizer, and
- (D) 0 to about 20 parts by weight of a fire-retarding assistant other than the fire retardant of (B), above.

Preferred as the hydrotalcites (C) used as a stabilizer in this invention are, for example, those of the formula (1)

$$Mg_{1-x}Al_x(OH)_2A_{x/n}{}^{n-}\cdot mH_2O$$

wherein $A^{n-}$ is an anion of n value, and x and m each represent a number shown by the following formulas $$0 < x < 0.5, \text{ preferably } 0.2 \leq x \leq 0.4, \text{ and } 0 < m < 1.$$

Preferred examples of the anions of n value shown by $A^{n-}$ in the above formula are $CO_3{}^{2-}$, $HPO_4{}^{2-}$, $SO_4{}^{2-}$ and $OH^-$. These anions $A^{n-}$ participate in the action of taking the halogens into the hydrotalcite structure by the hereinbefore-described ion-exchange reaction.

The hydrotalcites utilized in this invention as the component (C) are those having a BET specific surface area not exceeding about 30 m²/g, preferably not exceeding about 20 m²/g, and more preferably not exceeding about 15 m²/g.

The crystal particle size of hydrotalcites (C) such as described shows good development, and the crystal strain is also small. Hence, these hydrotalcites having a small secondary particle size demonstrate superior dispersibility in the thermoplastic or thermosetting resins, with the consequence that there is no risk of these hydrotalcites adversely affecting the moldability and properties of the resin composition. Again, these hydrotalcites are useful in ensuring that the action of trapping the halogens is manifested uniformly throughout the resin composition. Moreover, since they do not exhibit any objectionable interaction with the other additives, troubles such as discoloration of the resin by reacting with an antioxidant, for example, do not occur.

The preferred crystal particle size is about 0.1 to about 1 micron, while the preferred average secondary particle size is not greater than about 5 microns, for example about 0.1 to about 5 microns, and more preferably not greater than about 1 micron.

Still more preferred as the hydrotalcites (C) to be used in this invention are those that satisfy the condition that their crystal particle size in the <003> direction, as measured by the X-ray diffraction method, is at least 600 Å, and more preferably at least 1000 Å. The usually available hydrotalcites have a BET specific surface area exceeding about 50 m²/g, an average secondary particle size of at least about 10 microns, and a <003> direction crystal particle size of not more than about 300 Å. A hydrotalcite having a BET specific surface area greatly exceeding the about 30 m²/g, as specified by this invention, is of no use in achieving the improvements intended by this invention. Hence, in this invention those hydrotalcites having a BET specific surface area not exceeding about 30 m²/g are used as the stabilizer.

As the hydrotalcites (C) to be used in this invention, preferred are those satisfying the aforesaid conditions as regards the BET specific surface area, more preferably those which also satisfy the conditions as regards the average secondary particle size, and still more preferably those which additionally satisfy the conditions as regards the crystal particle size in the <003> direction.

The hydrotalcites (C) having a BET specific surface area not exceeding about 30 m²/g used as stabilizers in this invention can be those that have been surface-treated, and such surface-treated hydrotalcites are preferably used. The compatibility with the resin and dispersibility therein, as well as a resistance to discoloration can be further enhanced by this surface treatment.

Usable as the surface treating agent in this treatment are the anionic surfactants, silane-type coupling agents, titanate-type coupling agents and higher fatty acid esters. These surface treating agents may be used in an amount of say about 0.1 to about 10 parts by weight per 100 parts by weight of the hydrotalcite.

As examples of the surface treating agents, there can be mentioned the anionic surfactants such as the alkali metal salts of the higher fatty acids as expressed by the formula RCOOM where R is a $C_8$–$C_{30}$ alkyl group, and M is an alkali metal atom; alkali metal salts of alkylsulfuric acids as expressed by the formula $ROSO_3M$ where R and M are as defined above; alkali metal salts of alkylsulfonic acids of the formula $RSO_3M$ where R and M are as defined above; alkali metal salts of alkylarylsulfonic acids of the formula R-aryl-$SO_3M$ where R and M are as defined above, and aryl is the aryl group; and alkali metal salts of sulfosuccinates of the formula

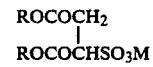

where R and M are as defined above.

Specific examples of the anionic surfactants include, for example, sodium stearate, potassium behenate, sodium montanate, potassium stearate, sodium oleate, potassium oleate, sodium palmitate., potassium palmitate, sodium laurate, potassium laurate, sodium dilaurylbenzenesulfonate, sodium octadecylsulfuric acid, sodium laurylsulfonate and sodium 2-sulfoethyl-alphasulfostearate.

As other examples of the surface treating agent, there can be mentioned the silane-type coupling agents such as vinyltriethoxysilane, gamma-aminopropyltrimethoxysilane, gamma-glycidoxypropyltrimethoxysilane and beta-(3,4-epoxycyclohexyl)ethyltrimethoxysilane; the titanate-type coupling agents such as isopropyltriisostearoyl titanate, isopropyltridodecylbenzenesulfonyl titanate, isopropyltris(dioctylpyrophosphate)titanate, tetraisopropylbis(dioctylphosphite)titanate and tetraoctylbis(ditridecylphosphite)titanate; and the higher fatty acid esters such as glycerol monostearate and glycerol oleate.

There is imposed no particular restriction as to the method of preparing the hydrotalcite stabilizers (C) that have been surface-treated with these surface treating agents, and any method can be used which brings these surface treating agents fully into contact with the hydrotalcite particles having a BET specific surface area not exceeding about 30 m²/g.

The surface treatment by means of an anionic surfactant can be carried out in the following manner. For example, an aqueous solution of an anionic surfactant is added to an aqueous suspension of a hydrotalcite of formula (1), or a powder of a hydrotalcite is added to an aqueous solution of an anionic surfactant, and the contact of the components is carried out say at a temperature above that at which the anionic surfactant dissolves in water for a period of from several minutes to about one hour. The surface treatment by means of a silane-type coupling agent or a titanate-type coupling agent is carried out in the following manner. For example, the coupling agent is dissolved in dioctyl phthalate or a solvent such as toluene, n-hexane, triethanolamine, methanol or ethanol, after which the resulting solution and a powder of a hydrotalcite of formula (1) are mixed say for about 0.1 to 1 hour using a mixer such as a Henschel mixer.

On the other hand, the surface treatment by means of the higher fatty acid esters is performed say in the following manner. First, the ester is heat-melted or heat-melted after mixing with say methanol or ethanol, following which the resulting melt and a hydrotalcite of formula (1) are mixed for say about 0.1 to 1 hour in a mixer such as a Henschel mixer.

Any of a wide range of moldable thermoplastic and thermosetting resins, inclusive of the elastomeric resins such as synthetic rubber, can be used as the resin in the fire-retardant resin composition of this invention, and this is one of the advantages of the present invention.

As examples of such resins, there can be mentioned as the thermoplastic resins the olefinic resins including the olefinic polymers or copolymers or the after-chlorinated resins thereof, such as polyethylene, polypropylene, polybutene-1, poly-4-methyl-1-pentene, ethylene/propylene copolymer, ethylene/butene-1 copolymer, ethylene/4-methyl-1-pentene copolymer, propylene/butene-1 copolymer, propylene/4-methyl-1-pentene copolymer, ethylene/propylene/diene copolymer, and the after-chlorinated products thereof; the styrene resins including the styrene polymers or copolymers such as polystyrene, ABS, AAS, AES and AS; the vinyl chloride or vinyl acetate resins including the vinyl chloride or vinyl acetate polymers or copolymers or the after-chlorinated resins thereof, such as the vinyl chloride resins, vinyl acetate resins, vinylidene chloride resins, ethylene/vinyl chloride copolymer, ethylene/vinyl acetate copolymer, and the after-chlorinated vinyl chloride resins; phenoxy resins, butadiene resins, epoxy resins, fluorine-containing resins; acetal resins, polyamide resins, polyamideimide resins, polyarylate resins, polyimide resins, polyester resins such as polyethylene terephthalate and polybutylene terephthalate, polycarbonate resins, polysulfone resins, polyphenylene oxide resins, polyphenylene sulfide resins, and (meth)acryl resins. On the other hand, as the thermosetting resins, included are the diallyl phthalate resins, vinyl ester resins, phenolic resins, unsaturated polyester resins, polyurethane, melamine resins and urea resins; while as the elastomeric resins, included are, for example, SBR, BR, IR, EPM, EPDM, NBR, CR, IIR, fluorine-contained rubber, acrylic rubber and chlorosulfonated polyethylene epichlorohydrin rubber.

In addition to the resin (A) and the hydrotalcite stabilizer (C), the fire-retardant resin composition of this contains a halogen-containing organic fire retardant (B).

Examples of the halogen-containing organic fire retardant are such halogen-containing organic hydrocarbon fire retardants as chlorinated polyethylene, chlorinated paraffin, brominated polyphenyl, chlorinated polyphenyl perchloropentacyclodecane, tetrabromoethane, tetrabromobutane, decabromo diphenyloxide, 1,2-dibromo-3-chloropropane, 1,2,3-tribromopropane, hexabromocyclodecane, tetrabromobenzene and chlorinated diphenyl; and the halogen-containing organophosphorous fire retardants such as tris(chloroethyl)phosphate, tris(dichloropropyl)phosphate, tris(chloropropyl)phosphate, bis(2,3-dibromopropyl)-2,3-dichloropropyl phosphate, tris(2,3-dibromopropyl)-phosphate and bis(chloropropyl)monooctyl phosphate.

The fire retardant resin composition of this invention can contain, in addition to the resin (A), halogen-containing organic fire retardant (B) and hydrotalcite stabilizer (C), other fire-retarding assistants (D) that are effective when used conjointly with the fire retardant (B).

As this fire-retarding assistant (D) other than the fire retardant (B), mention can be made of such antimony fire retardants as antimony oxide and sodium antimonate; zirconium oxide; and such halogen-non-containing organophosphorous fire retardants as trimethyl phosphate, triethyl phosphate, tributyl phosphate, trioctyl phosphate, tributoxyethyl phosphate, tricresyl phosphate, cresyldiphenyl phosphate, octyldiphenyl phosphate, polyphosphonate, polyphosphate and aromatic polyphosphate.

The fire retardant resin composition of this invention contains the hydrotalcite stabilizer (C) having a BET specific surface area not exceeding about 30 $m^2/g$ in an amount of about 0.05 to about 10 parts by weight, preferably about 0.1 to about 5 parts by weight, based on 100 parts by weight of the resin (A). When the amount of the component (C) departs from the above range and is too small, the halogen trapping effect is not fully manifested. On the other hand, when the amount greatly exceeds the foregoing range, adverse effects appear in say the mechanical strength and moldability of the resin and the appearance of the molded article. It is hence recommended that the hydrotalcite stabilizer be used in an amount within the above range.

On the other hand, the halogen-containing fire retardant (B) can be used in its usually used amounts, for example, about 1 to about 50 parts by weight, preferably about 5 to about 30 parts by weight. If the amount used departs from the range indicated above and is too small, difficulty will be experienced in imparting the desired fire-retarding effects. On the other hand, if the amount is greatly in excess of the amount specified above, adverse effects are had on the properties of the resins, and since the use of the fire retardant in excess does not mean that greater fire-retardant effects are had, the use of the fire retardant in the range indicated above is recommended. An amount up to about 20 parts by weight should be sufficient in the case of the fire-retarding assistant (D).

There is imposed no particular restriction as to the procedure per se for mixing the components for obtaining the fire-retardant resin of this invention, and any means may be used for homogeneously mixing the components (A), (B), (C) and (D) or other additives. For example, such means as a ribbon blender, high-speed mixer-cokneader, pelletizer, mixing rolls, extruder and intensive mixer can be employed.

In practicing the present invention, other additives that are customarily used with resin compositions can be incorporated in addition to the aforesaid specific hydrotalcites (C). As examples of such additives, there can be named the antioxidants such as 2,6-di-t-butyl-p-cresol, 2,5-di-t-butylhydroquinone, 2,2'-methylenebis(4-methyl-6-t-butylphenol), 4,4'-thiobis-(6-t-butylphenol), 4,4'-thiobis-(6-t-butyl-mcresol) and octadecyl-3-(3',5'-di-t-butyl-4'hydroxyphenyl) propionate; ultraviolet absorbents such as 2-hydroxy-4-octoxybenzophenone, 2-(2'-hydroxy-5methylphenyl) benzotriazole and ethyl-2-cyano-3,3diphenylacrylate; antistatic agents such as pentaerythritol monostearate, sorbitan monopalmitate, sulfated oleic acid, polyethylene oxide and Carbowax; lubricants such as calcium stearate, zinc stearate, butyl stearate and ethylenebis-stearamide; plasticizers such as dimethyl phthalate, diethyl phthalate, oleates, phosphates, waxes and liquid paraffin; colorants such as carbon black, phthalocyanine, quinacridone, indoline, azo dyes, titanium dioxide and red iron oxide; and fillers such as asbestos, glass fibers, carbon fibers, talc, mica, wollastonite, calcium silicate, aluminum silicate and calcium carbonate. The amounts in which these additives are incorporated may be suitably chosen. For example, these additives may be incorporated in the following amounts based on the resin (A): about 0.01 to about 1.0% of the antioxidants, about 0.01 to about 1.0% of the ultraviolet absorbents, about 0.01 to about 1.0% of the antistatic agents, about 0.1 to about 5% of the lubricants, about 0.1 to about 10% of the plasticizers, about 0.1 to about 5% of the colorants, and about 1 to about 50% of the fillers.

The hydrotalcite (C) used in this invention is commercially available say as a product of Kyowa Chemical Industry Co., Ltd., or it can be obtained, for example by heat-treating in an aqueous medium a hydrotalcite obtained by methods disclosed in say Japanese Patent Publications Nos. 2280/1971, 32198/1972, 30039/1975, 2947/1973 and 29129/1976, Japanese Laid-Open Patent Publication No. 222128, and U.S. Pat. No. 4,284,762, as well as by other methods. If one mode is described by way of example, a hydrotalcite obtained by the above-exemplified methods is heat-treated in an aqueous medium in an autoclave at a temperature above about 150° C., for example about 150° to about 250° C. for about 5 to about 30 hours to give the hydrotalcite (C) to be used in this invention. This heat-treatment consists in hydrothermally treating the hydrotalcite under superatomospheric conditions, preferably employing a temperature at the high side of the range indicated above. While treating conditions exceeding 250° C. can be employed, no special benefits are obtained thereby. Hence, it is preferred that the temperature be one in the above range.

The following examples and comparative examples will serve to illustrate the present invention more fully.

In the examples the tests for rustproofness, discoloration and melt flow index were carried out in the following manner.

Rustproofness test

A degreased and well polished sheet of mild steel (40×40 mm) is immersed at 230° C. in a pelletized resin composition and heated at 200° C. for 30 minutes. After allowing the immersed sheet steel to cool, it is withdrawn from the sample, placed in a desiccator whose relative humidity has been adjusted to about 93% and left to stand at 60° C. for 20 hours. The degree of rusting of the sheet of mild steel is then assigned a rank from class 1 to class 10, class 1 being one in which there is observed no change at all, while class 10 being that in which virtually all of the surface is rusted. The degree of rusting is evaluated in accordance with the following criterion. Class 4 or above denotes the possession of a serviceable rustproofness, especially preferred being that possessing a rustproofness of class 3 or above.

| | |
|---|---|
| Class 1 | No change. |
| Class 2 | Rust formation on less than 1% of the whole surface area. |
| Class 3 | Rust formation on 1 to less than 5% of the whole surface area. |
| Class 4 | Rust formation on 5 to less than 10% of the whole surface area. |
| Class 5 | Rust formation on 10 to less than 20% of the whole surface area. |
| Class 6 | Rust formation on 20 to less than 30% of the whole surface area. |
| Class 7 | Rust formation on 30 to less than 50% of the whole surface area. |
| Class 8 | Rust formation on 50 to less than 70% of the whole surface area. |
| Class 9 | Rust formation on 70 to less than 90% of the whole surface area. |
| Class 10 | Rust formation on virtually the whole surface. |

Discoloration test

An injection molded disk having a thickness of about 3.2 mm and a diameter of 10 cm is held in an oven at 150° C. for 2 days, after which its degree of discoloration (b) is determined using a colorimeter. A larger (b) value denotes that the degree of yellowness is more intense.

Melt flow index (heat resistance) test

In the case of say propylene, the pellets are repeatedly passed through an extruder for five times. These pellets are then measured for their melt flow index at 230° C. and a pressure of 216 kg/cm$^2$. A melt flow index of higher numerical value denotes that the degradation of the resin is greater.

EXAMPLES 1 to 3 AND COMPARATIVE EXAMPLES 1 to 3

To 100 parts by weight of a polypropylene resin (A) were added 20 parts by weight of decabromodiphenyl oxide as the halogen-containing organic fire retardant (B), 7 parts by weight of antimony trioxide (D), and as the stabilizer (C) at least one member of the group consisting of a hydrotalcite, tribasic lead sulfate and zinc stearate, in an amount (parts by weight) shown in Table 1, below, based on 100 parts by weight of the polypropylene resin, and the mixture was mixed in a Henschel mixer. This was followed by melt-kneading the mixture at 230° C. using an extruder. A part of the resulting pellets were injection molded at 230° C. into a disk having a thickness of 3.2 mm and a diameter of 10 cm.

The pellets and injection molded disk thus obtained were used, and tests for their rustproofness, discoloration and thermal stability were conducted. The results obtained are shown in Table 1. The hydrotalcite used in these experiments was prepared in the following manner. A hydrotalcite having a BET specific surface area and a composition of $Mg_{0.7}Al_{0.3}(OH)_2\text{-}(CO_3)_{0.5}\cdot 0.55 H_2O$ was treated at 250° C. for 2 hours followed by removal of its water of crystallization. Three parts by weight of a liquid of glycerol monostearate at about 80° C. was then added to 100 parts by weight of the dehydrated product with stirring in a Henschel mixer, after which the mixture was stirred at about 150° C. for about 5 minutes to carry out the surface treatment.

TABLE 1

| Example | Class of stabilizer | Amount added (wt. parts) | Rust-proof-ness | Resistance to discoloration | Melt flow index g/10 min. |
| --- | --- | --- | --- | --- | --- |
| Example | | | | | |
| 1 | Hydrotalcite | 0.5 | Class 2 | +2.8 | 4.7 |
| 2 | " | 1.0 | Class 1 | +2.0 | 4.1 |
| 3 | " | 0.2 | Class 3 | +4.2 | 5.4 |
| Comparative Example | | | | | |
| 1 | Tribasic lead sulfate | 1.0 | Class 8 | +17.1 | 11.3 |
| 2 | Calcium stearate | 1.0 | Class 9 | +18.9 | 13.0 |
| 3 | " | 2.0 | Class 5 | +28.9 | 11.1 |

EXAMPLES 4 and 5 AND COMPARATIVE EXAMPLE 4

To 100 parts by weight of a low density polyethylene resin (A) were added 30 parts by weight of a chlorinated polyethylene resin (B), 15 parts by weight of antimony trioxide (D), and a hydrotalcite (C) in an amount (parts by weight) shown in Table 2, below. After mixing the components, the mixture was melt-kneaded by means of an extruder at about 190° C. A part of the resulting pellets were used to injection mold them at about 200° C. into a disk having a thickness of about 3.2 mm and a diameter of 10 cm. The remaining pellets were passed through an extruder at about 190° C. for five times. The melt flow index was then determined. The results obtained are shown in Table 2. The hydrotalcite used in these experiments were prepared in the following manner. One kilogram of a powder of a hydrotalcite having a BET specific surface area of 9 $m^2/g$ and a composition of $Mg_{0.66}Al_{0.34}(OH)_2$-$(CO_3)_{0.17} \cdot 0.46H_2O$ was suspended in 10 liters of warm water at about 80° C., and to this suspension was then added with stirring an aqueous sodium stearate solution that had been obtained by dissolving about 40 g of sodium stearate in warm water at about 80° C. After continuing the stirring for about 20 minutes, the mixture was dehydrated, dried and comminuted to give the treated hydrotalcite.

By way of comparison, an experiment was conducted but using octyl tin instead of the hydrocalcite (Comparative Example 4).

EXAMPLE 6 AND COMPARATIVE EXAMPLE 5

One hundred parts by weight of polystyrene (A) was mixed with 12 parts by weight of hexabromocyclodecane (B), 5 parts by weight of tris(2,3-dibromopropyl)-phosphate (B), and the stabilizer shown in Table 2, below, and the mixture was treated as in Example 1. The results obtained are shown in Table 2.

EXAMPLE 7 AND COMPARATIVE EXAMPLE 6

To 100 parts by weight of an epoxy resin (A) were added 28 parts by weight of tris(beta-chloroethyl)phosphate (B), and the stabilizer shown in Table 2, below, after which 10 parts by weight of diethylenetriamine was added as a hardener. The mixture was then left standing at 25° C. for 24 hours to harden it into a 3-mm-thick sheet. A well-polished sheet of mild steel was sandwiched between two sheets of the epoxy resin, and the assembly was heated at 250° C. for one hour. The sheet of mild steel was then taken out and submitted to the hereinbefore-described rustproofness test. The stabilizer used was obtained in the following manner. A hydrotalcite having a BET specific surface area of 18 $m^2/g$ and a composition of $Mg_{0.8}Al_{0.2}(OH)_2$-$(CO_3)_{0.7} \cdot 0.6H_2O$ was suspended in water, following which a 25% aqueous solution of sodium polyoxyethylenelaurylethersulfate was added in an amount of 10 parts by weight to 100 parts by weight of the hydrotalcite. The mixture was then stirred at room temperature for 20 minutes, and thereafter it was filtered, dehydrated, dried and comminuted to give the stabilizer.

EXAMPLE 8 AND COMPARATIVE EXAMPLE 7

To 100 parts by weight of a novolak-type phenolic resin (A) were added 20 parts by weight of tris(2,3-dibromopropyl)phosphate (B) as a fire retardant, and the stabilizer shown in Table 2, and the mixture was hardened with hexamethylenetetramine to give a 3-mm-thick sheet. A well-polished sheet of mild steel was sandwiched between two sheets of the phenolic resin and the assembly was heated at 260° C. for 2 hours. The sheet of mild steel was then taken out and submitted to the rustproofness test. The stabilizer used was a hydrotalcite having a BET specific surface area of 9 $m^2/g$ and a composition of $Mg_{0.72}Al_{0.28}(OH)_{2.28} \cdot 0.68H_2O$.

TABLE 2

Rustproofness, resistance to discoloration and heat resistance of hydrotalcite stabilizers

| Example | Class of stabilizer and amount added | | Class of resin | Rust-proof-ness | Resistance to discoloration | Melt flow index (heat resistance) (g/10 min) |
| --- | --- | --- | --- | --- | --- | --- |
| Example 4 | Hydrotalcite | 0.1 | Polyethylene | Class 2 | +4.0 | 5.2 |
| Example 5 | " | 0.5 | " | Class 1 | +2.4 | 4.8 |
| Comparative Example 4 | Octyltin | 1.0 | " | Class 8 | +15.7 | 15.1 |
| Example 6 | Hydrotalcite | 0.5 | Polystyrene | Class 2 | +3.2 | 4.7 |
| Comparative Example 5 | Calcium stearate | 1.0 | " | Class 8 | +12.5 | 16.3 |
| Example 7 | Hydrotalcite | 0.3 | Epoxy | Class 1 | +2.9 | — |
| Comparative Example 6 | Calcium stearate | 1.0 | " | Class 7 | +13.0 | — |
| Example 8 | Hydrotalcite | 0.8 | Phenol | Class 1 | +2.8 | — |

TABLE 2-continued

Rustproofness, resistance to discoloration and heat resistance of hydrotalcite stabilizers

| Example | Class of stabilizer and amount added | | Class of resin | Rust-proofness | Resistance to discoloration | Melt flow index (heat resistance) (g/10 min) |
|---|---|---|---|---|---|---|
| Comparative Example 7 | Calcium stearate | 2.0 | " | Class 7 | +11.7 | — |

What we claim is:

1. A fire-retardant resin composition comprising
   (A) 100 parts by weight of a member selected from the group consisting of the thermoplastic resins and the thermosetting resins,
   (B) about 5 to about 30 parts by weight of a halogen-containing organic fire retardant,
   (C) about 0.1 to about 5 parts by weight of a hydrotalcite having a BET specific surface area not exceeding about 30 square meters per gram, as a stabilizer, and represented by the formula (1)

$$Mg_{1-x}Al_x(OH)_2A_{x/n}{}^{n-}\cdot mH_2O \quad (1)$$

wherein $A^{n-}$ is an anion of n value, and x and m each represent a number shown by the following formulas $$0<x<0.5 \text{ and } 0<m<1, \text{ and}$$

(D) 0 to about 20 parts by weight of a fire-retarding assistant other than the fire retardant of (B), above, said halogen-containing organic fire retardant (B) is selected from the group consisting of chlorinated polyethylene, chlorinated paraffin, brominated polyphenyl, chlorinated polyphenyl, perchloropentacyclodecane, tetrabromoethane, tetrabromobutane, decabromo diphenyloxide, 1,2-dibromo-3-chloropropane, 1,2,3-tribromopropane, hexabromocyclodecane, tetrabromobenzene and chlorinated diphenyl.

2. A fire-retardant resin composition comprising
   (A) 100 parts by weight of a member selected from the group consisting of the thermoplastic resins and the thermosetting resins,
   (B) about 5 to about 30 parts by weight of a halogen-containing organophosphorous fire retardant,
   (C) about 0.1 to about 5 parts by weight of a hydrotalcite having a BET specific surface area not exceeding about 30 square meters per gram, as a stabilizer, and represented by the formula (1)

$$Mg_{1-x}Al_x(OH)_2A_{x/n}{}^{n-}\cdot mH_2O \quad (1)$$

wherein $A^{n-}$ is an anion of n value, and x and m each represent a number shown by the following formulas $$0<x<0.5 \text{ and } 0<m<1,$$
and
   (D) 0 to about 20 parts by weight of a fire-retarding assistant other than the fire retardant of (B), above, said halogen-containing organophosphorous fire retardant (B) is selected from the group consisting of tris(chloropropyl) phosphate, tris(dichloropropyl)phosphate, tris(chloropropyl)phosphate, bis(2,3-dibromopropyl)-2,3-dichloropropyl phosphate, tris(2,3-dibromopropyl)phosphate and bis(chloropropyl)monooctyl phosphate.

3. A fire-retardant resin composition comprising:
   (A) 100 parts by weight of a member selected from the group consisting of the thermoplastic resins and the thermosetting resins;
   (B) 1 to 50 parts by weight of a halogen-containing organic fire retardant or a halogen-containing organophosphorous fire-retardant;
   (C) 0.05 to 10 parts by weight of a hydrotalcite having a BET specific surface area not exceeding 30 square meters per gram, as a stabilizer, and represented by the formula (1)

$$Mg_{1-x}Al_x(OH)_2A_{x/n}{}^{n-}\cdot mH_2O \quad (1)$$

wherein $A^{n-}$ is an anion of n value, and x and m each represent a number shown by the following formulas $$0<x<0.5 \text{ and } 0<m<1, \text{ and}$$

(D) 0 to 20 parts by weight of a fire-retarding assistant other than the fire retardant of (B), above.

4. The resin composition of claim 3 wherein said halogen-containing organic fire retardant (B) is in an amount of 5 to 30 parts by weight.

5. The resin composition of claim 3 wherein the thermoplastic and thermosetting resins (A) are members selected from the group consisting of the olefinic resins, styrene resins, vinyl chloride and vinyl acetate resins, phenoxy resins, butadiene resins, epoxy resins, fluorine-contained resins, acetal resins, polyamide resins, polyamideimide resins, polyacrylate resins, polyimide resins, polyester resins, polycarbonate resins, polysolfone resins, polyphenylene oxide resins, polyphenylene sulfide resins, (meth)acryl resins, diallyl phthalate resins, phenolic resins, unsaturated polyester resins, polyurethane resins, melamine resins, urea resins and elastomeric resins.

6. The resin composition of claim 3 wherein said resin composition further contains at least one other additive selected from the group consisting of antioxidants, ultraviolet absorbents, antistatic agents, lubricants plasticizers, colorants and fillers.

7. The resin composition of claim 3 which comprises from about 5 to about 30 parts by weight of the fire retardant (B) and from about 0.1 to about 5 parts by weight of the hydrotalcite stabilizer (C).

8. The resin composition of claim 3 wherein the component (A) is a thermoplastic resin.

9. The resin composition of claim 3 wherein the component (A) is the thermosetting resin.

10. The resin composition of claim 9 wherein the thermosetting resin is selected from the group consisting of diallyl phthalate resins, vinyl ester resins, phenolic resins, unsaturated polyester resins, polyurethane, melamine resins and urea resins.

11. The resin composition of claim 3 wherein (A) is an elastomeric resin.

12. The resin composition of claim 3 wherein the fire retardant is a halogen-containing organophosphorous fire retardant.

13. The resin composition of claim 3 wherein the hydrotalcite (C) has been treated with a surface treating agent.

14. The resin composition of claim 13 wherein the surface treating agent is selected from the group consisting of anionic surfactants, silane coupling agents, titanate coupling agents and higher fatty acid esters.

15. The resin compositions of claim 14 wherein the surface treating agent is a silane coupling agent selected from the group consisting of vinyltriethoxysilane, gamma-aminopropyltrimethoxysilane, gamma-glycidoxypropyltrimethoxysilane and beta-(3,4-epoxycyclohexyl)ethyltrimethoxysilane.

16. The resin composition of claim 14 wherein the surface treating agent is a titanate coupling agent selected from the group consisting of isopropyltriisostearoyl titanate, isopropyltridodecylbenzenesulfonyl titanate, isopropyltris(dioctylpyrophosphate) titanate, tetraisopropylbis(dioctylphosphite) titanate, and tetraoctylbis(ditridecylphosphite) titanate.

17. The resin composition of claim 14 wherein the surface treating agent is a higher fatty acid ester selected from the group consisting of glycerol monostearate and glycerol oleate.

18. The resin composition of claim 3 wherein the thermoplastic resins and the thermosetting resins (A) are members selected from the group consisting of olefinic resins, styrene resins, epoxy resins and phenolic resins.

19. The resin composition of claim 1 wherein the hydrotalcite (C) has been treated with a surface treating agent.

20. The resin composition of claim 2 wherein the hydrotalcite (C) has been treated with a surface treating agent.

* * * * *